United States Patent
Zapata et al.

(10) Patent No.: US 11,131,903 B2
(45) Date of Patent: Sep. 28, 2021

(54) SYSTEM AND METHOD FOR AUTOMATED MODULAR ILLUMINATION AND DEPLOYMENT

(71) Applicant: Gentex Corporation, Zeeland, MI (US)

(72) Inventors: Jorge Zapata, Chagrin Falls, OH (US); Carlos Eduardo Vargas Silva, Antioquia (CO)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/906,401

(22) Filed: Jun. 19, 2020

(65) Prior Publication Data

US 2020/0401016 A1    Dec. 24, 2020

Related U.S. Application Data

(60) Provisional application No. 62/863,903, filed on Jun. 20, 2019.

(51) Int. Cl.
*G03B 15/05* (2021.01)
*H04N 7/18* (2006.01)

(52) U.S. Cl.
CPC ............. *G03B 15/05* (2013.01); *H04N 7/185* (2013.01); *G03B 2215/0557* (2013.01)

(58) Field of Classification Search
CPC ............ G03B 15/05; G03B 2215/0557; H04N 7/185; F21V 14/02; F21V 21/14;

(Continued)

(56) References Cited

U.S. PATENT DOCUMENTS

| | | | |
|---|---|---|---|
| 4,639,838 A | 1/1987 | Kato et al. | |
| 5,347,431 A * | 9/1994 | Blackwell | A61B 90/35 362/11 |

(Continued)

FOREIGN PATENT DOCUMENTS

| | | |
|---|---|---|
| CN | 107799171 A | 3/2018 |
| KR | 20160007700 A | 1/2016 |

(Continued)

OTHER PUBLICATIONS

Hunt, Barry "Introduction to UV Surface Disinfection" InfectionControl.tips, Jan. 21, 2016, https//infectioncontrol.tips/2016/01/21/1423/.

*Primary Examiner* — Bao Q Truong
(74) *Attorney, Agent, or Firm* — Price Heneveld LLP; Bradley D. Johnson

(57) ABSTRACT

A system for controlling a plurality of lighting assemblies and a plurality of imagers configured to capture image data in a plurality fields of an operating region comprises a collapsible armature comprising a plurality of linkages configured to extend between an extended arrangement and a collapsed arrangement. The extended arrangement positions the lighting assemblies in a first spacing, and the collapsed arrangement positions the lighting assemblies in a second spacing. A controller is configured to control lighting emissions from light sources of the lighting assemblies based on the predetermined first spacing and detect at least one object in the fields of view and control the lighting assemblies to illuminate the at least one object.

20 Claims, 10 Drawing Sheets

(58) Field of Classification Search
CPC .......... F21V 21/24; F21V 21/26; F21V 21/28; F21V 21/29; F21V 21/30; F21V 23/003; F21V 23/0471; F21V 23/0478; F21V 23/0442

See application file for complete search history.

(56) References Cited

U.S. PATENT DOCUMENTS

| | | | |
|---|---|---|---|
| 5,406,176 A * | 4/1995 | Sugden | H05B 47/155 315/292 |
| 6,079,862 A | 6/2000 | Kawashima et al. | |
| 6,471,363 B1 * | 10/2002 | Howell | E04B 9/006 348/370 |
| 7,224,472 B2 * | 5/2007 | Bauch | A61B 90/30 356/611 |
| 7,431,482 B1 * | 10/2008 | Morgan | F21S 8/02 362/364 |
| 7,706,683 B2 | 4/2010 | Rossner et al. | |
| 8,736,548 B2 | 5/2014 | Pryor | |
| 8,817,085 B2 | 8/2014 | Hiltl et al. | |
| 8,905,585 B2 | 12/2014 | Dallam et al. | |
| 9,222,257 B2 | 12/2015 | Dallam et al. | |
| 9,513,113 B2 | 12/2016 | Yang et al. | |
| 10,119,808 B2 | 11/2018 | Venkataraman et al. | |
| 10,231,607 B2 | 3/2019 | Charles et al. | |
| 10,240,751 B2 | 3/2019 | Zapata et al. | |
| 10,277,842 B1 | 4/2019 | Cooper et al. | |
| 10,517,158 B2 | 12/2019 | Hallack et al. | |
| 2002/0145591 A1 | 10/2002 | Hato et al. | |
| 2008/0117569 A1 | 5/2008 | Lee | |
| 2009/0037446 A1 | 2/2009 | Tonev et al. | |
| 2009/0303714 A1 * | 12/2009 | Kanpurwala | F21V 21/20 362/235 |
| 2012/0206050 A1 | 8/2012 | Spero | |
| 2017/0180720 A1 | 6/2017 | Jarc | |
| 2019/0060026 A1 | 2/2019 | Geerlings et al. | |
| 2019/0117809 A1 | 4/2019 | Katz | |

FOREIGN PATENT DOCUMENTS

| | | |
|---|---|---|
| KR | 101621220 B1 | 5/2016 |
| KR | 20180057447 A | 5/2018 |
| WO | 0035402 | 6/2000 |
| WO | 2004100815 A2 | 11/2004 |
| WO | 2013111134 A1 | 8/2013 |

* cited by examiner

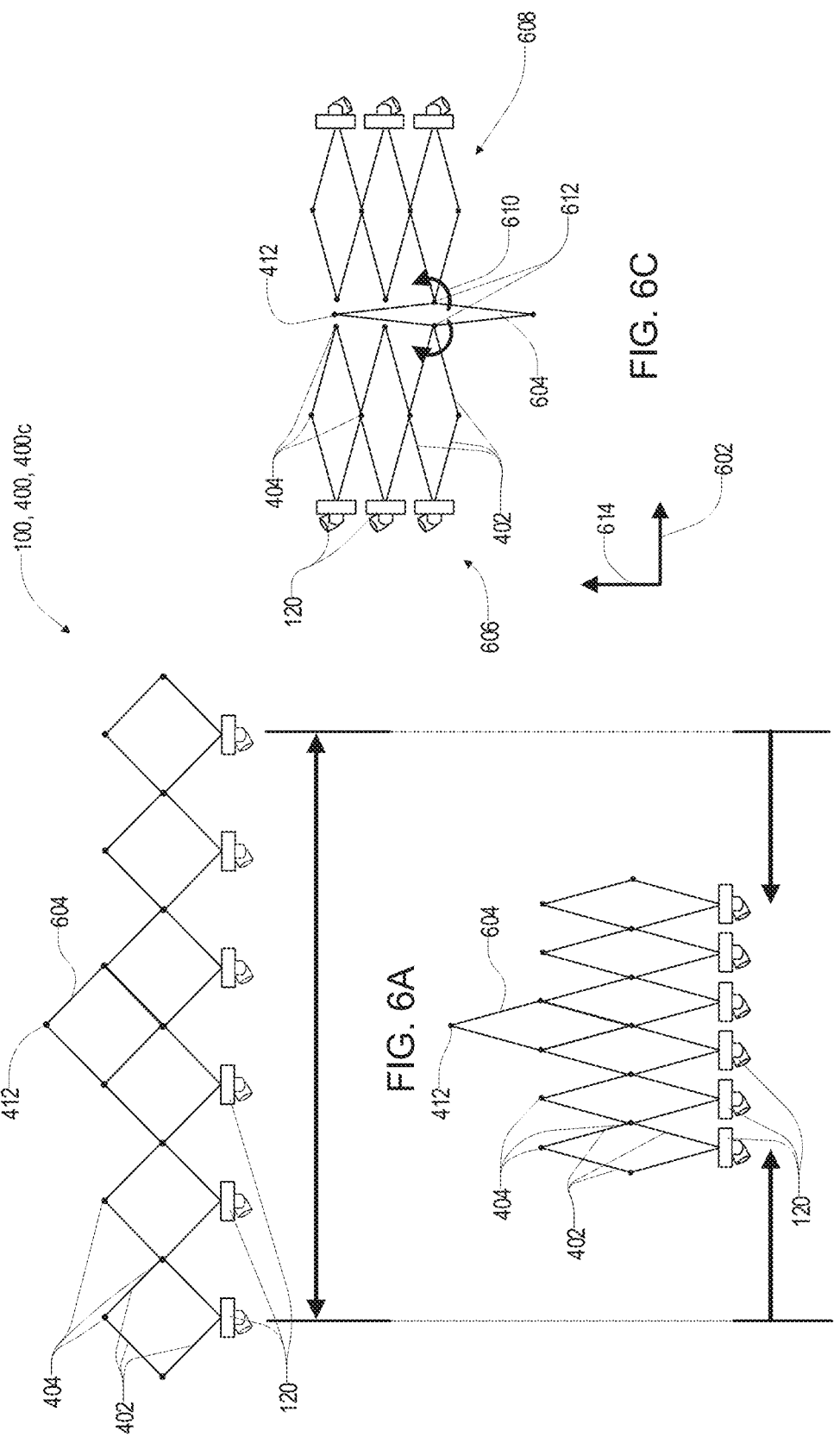

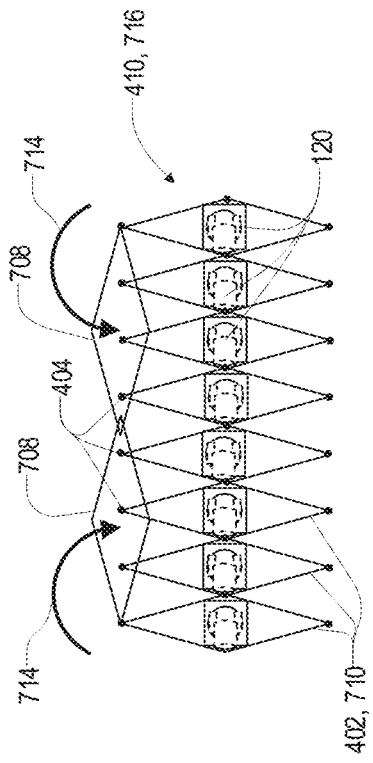
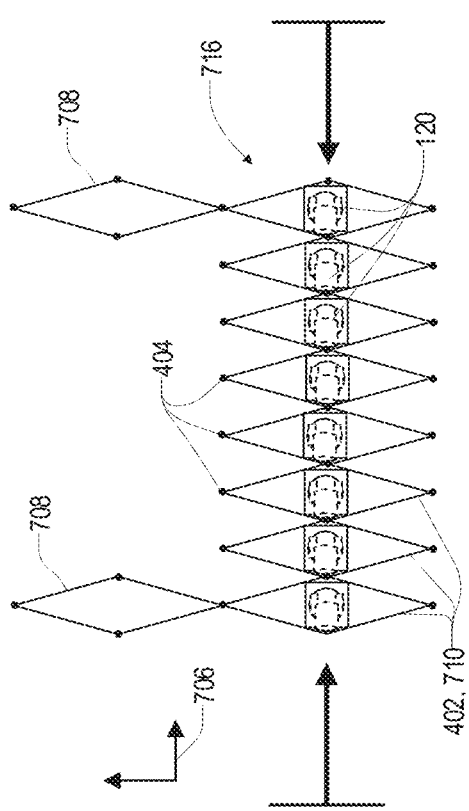
FIG. 7B
FIG. 7C
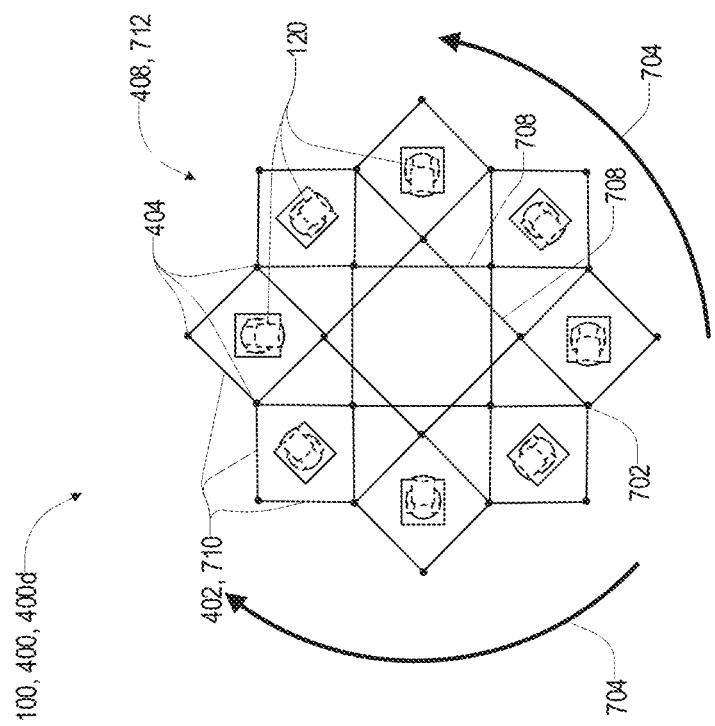
FIG. 7A

SYSTEM AND METHOD FOR AUTOMATED MODULAR ILLUMINATION AND DEPLOYMENT

CROSS-REFERENCE TO RELATED APPLICATION

This application claims priority to and the benefit under 35 U.S.C. § 1110(e) of U.S. Provisional Patent Application No. 62/863,903, filed on Jun. 20, 2019, entitled "ILLUMINATING SYSTEM AND METHOD FOR MOVING TARGETS AND/OR MOVING ILLUMINATING SOURCE (DEPLOYMENT)," the disclosure of which is hereby incorporated herein by reference in its entirety.

TECHNOLOGICAL FIELD

The present disclosure relates generally to a lighting system and, more particularly, relates to a portable lighting system configured to implement computerized vision.

SUMMARY OF THE INVENTION

In one aspect of the invention, a system for controlling a plurality of lighting assemblies and a plurality of imagers configured to capture image data in a plurality fields of an operating region is disclosed. The system comprises a collapsible armature comprising a plurality of linkages configured to extend between an extended arrangement and a collapsed arrangement. The extended arrangement positions the lighting assemblies in a first spacing and the collapsed arrangement positions the lighting assemblies in a second spacing. A controller is configured to receive the image data from a plurality of fields of view of the plurality of imagers in the operating region and control an orientation of each of the lighting assemblies in the extended arrangement based on the predetermined first spacing. The controller is further configured to control a direction of the lighting emissions from each lighting assemblies based on the orientation and detect at least one object in the fields of view and control the lighting assemblies to illuminate the at least one object.

In another aspect of the invention, a portable light system is disclosed. The system comprises a lighting array comprising a plurality of lighting modules configured to emit light emissions into an operating region. The lighting array is configured to adjust a direction of the lighting emissions about a plurality of axes. The system further comprises a collapsible armature in connection with each of the lighting modules. The collapsible armature is configured to extend between an extended arrangement, wherein the lighting modules are arranged in a first spatial configuration, and a collapsed arrangement, wherein the lighting assemblies are arranged in a second spatial configuration. At least one imager in connection with the collapsible armature is configured to capture image data in a field of view directed into the operating region. The system further comprises a controller configured to process the image data and detect at least one object and control the lighting modules to illuminate the at least one object in a plurality of locations in the operating region. The direction of the lighting emissions and a corresponding location in the operating region impinged upon by the lighting emissions is adjusted by the controller based on a predetermined relationship of the lighting assemblies set by the first spatial configuration.

A modular illumination apparatus is disclosed. The system comprises a lighting array comprising a plurality of lighting modules configured to emit light emissions into an operating region. The lighting array is configured to adjust a direction of the lighting emissions about a plurality of axes. A collapsible armature is in connection with each of the lighting modules. The collapsible armature is configured to extend between an extended arrangement, wherein the lighting modules are arranged in a first spatial arrangement, and a collapsed arrangement, wherein the lighting assemblies are arranged in a second spatial arrangement. A plurality of imagers are in connection with the lighting modules. The imagers are configured to capture image data in a plurality of fields of view distributed through the operating region. The system further comprises a controller configured to process the image data from the plurality of imagers and identify a location of the at least one object in the operating region and detect a location of the at least one object in the operating region in the fields of view based on the first spatial arrangement of the lighting modules and the corresponding positions of the fields of view of the imagers in the operating region. The controller is further configured to control the lighting modules to illuminate at least one target area in the location identified in the image data. The direction of the lighting emissions and the location in the operating region impinged upon by the lighting emissions is adjusted by the controller based on a predetermined relationship of the lighting assemblies set by the first spatial arrangement.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which:

FIG. 6A is a side view of a lighting system deployed on a collapsible armature in an extended or deployed arrangement;

FIG. 6B is a side view of a lighting system deployed on a collapsible armature in an intermediate arrangement;

FIG. 6C is a side view of a lighting system deployed on a collapsible armature in a collapsed transport arrangement;

FIG. 7A is a top view of a lighting system deployed on a collapsible armature in an extended or deployed arrangement;

FIG. 7B is a top view of a lighting system deployed on a collapsible armature in an intermediate arrangement;

FIG. 7C is a top view of a lighting system deployed on a collapsible armature in a collapsed transport arrangement;

DETAILED DESCRIPTION OF EMBODIMENTS

Figure 1:
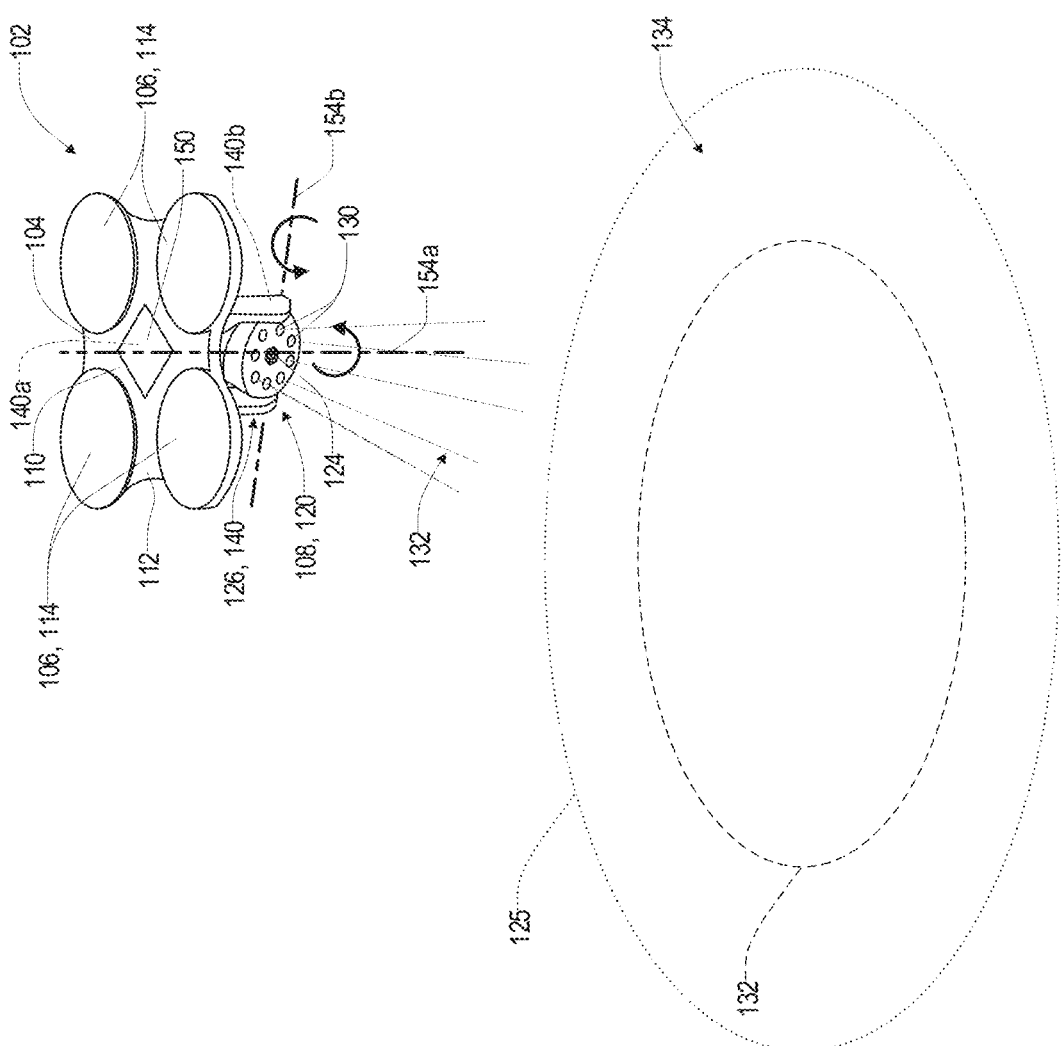
FIG. 1 is a projected view of a drone or unmanned aerial device (UAD) comprising a lighting system.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

The disclosure provides for various examples of coordinated lighting systems. The disclosure addresses the illumination of moving targets in rough terrain, and various static illumination examples that may require a portable or moving illumination. In some examples, the disclosed systems may be implemented as transportable operating rooms for medical and dental examinations, transportable laboratories, or lighting application. In various examples, the disclosure provides for the tracking and illumination of objects and uniform lighting portable or transportable applications.

Figure 2:
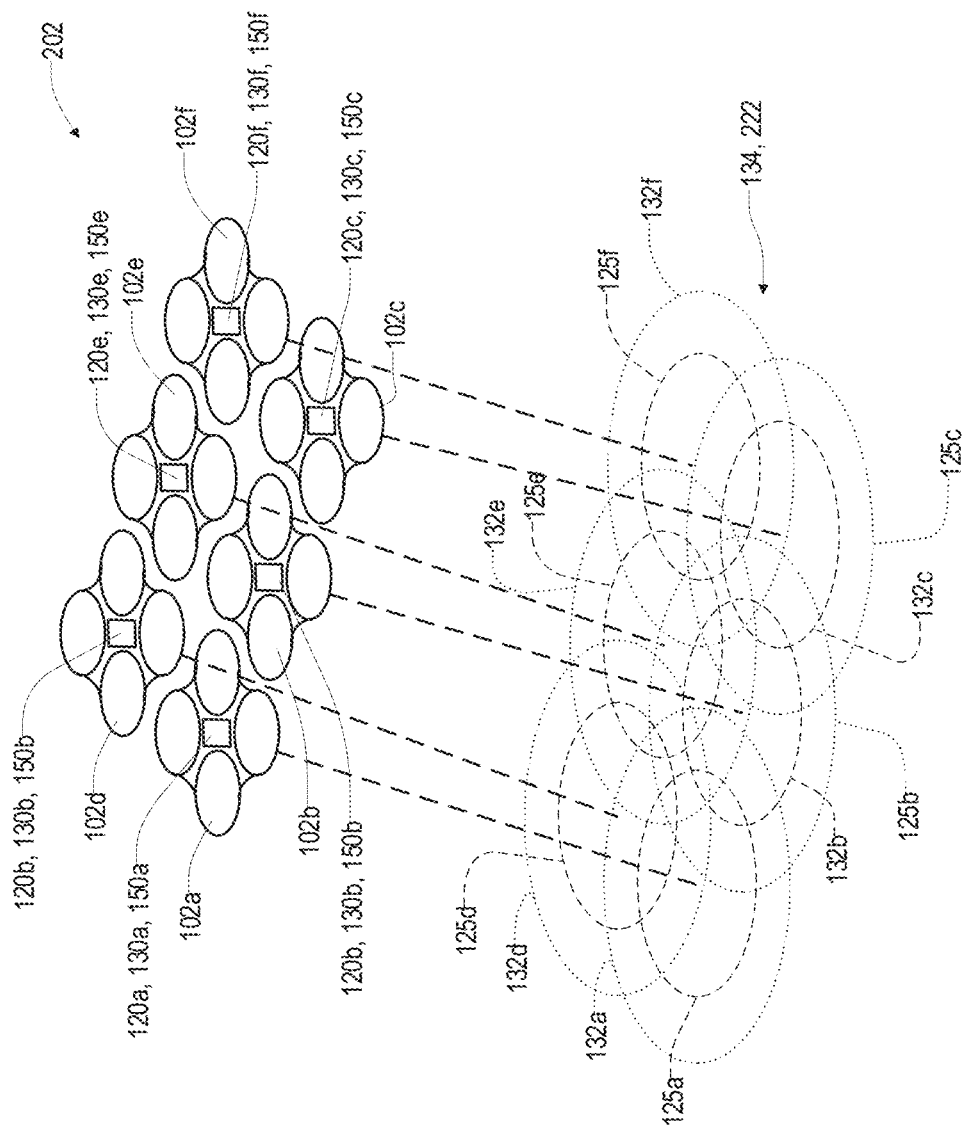
FIG. 2 is a projected view of a grouping of drones comprising a lighting system operating in a first configuration.
Figure 3:
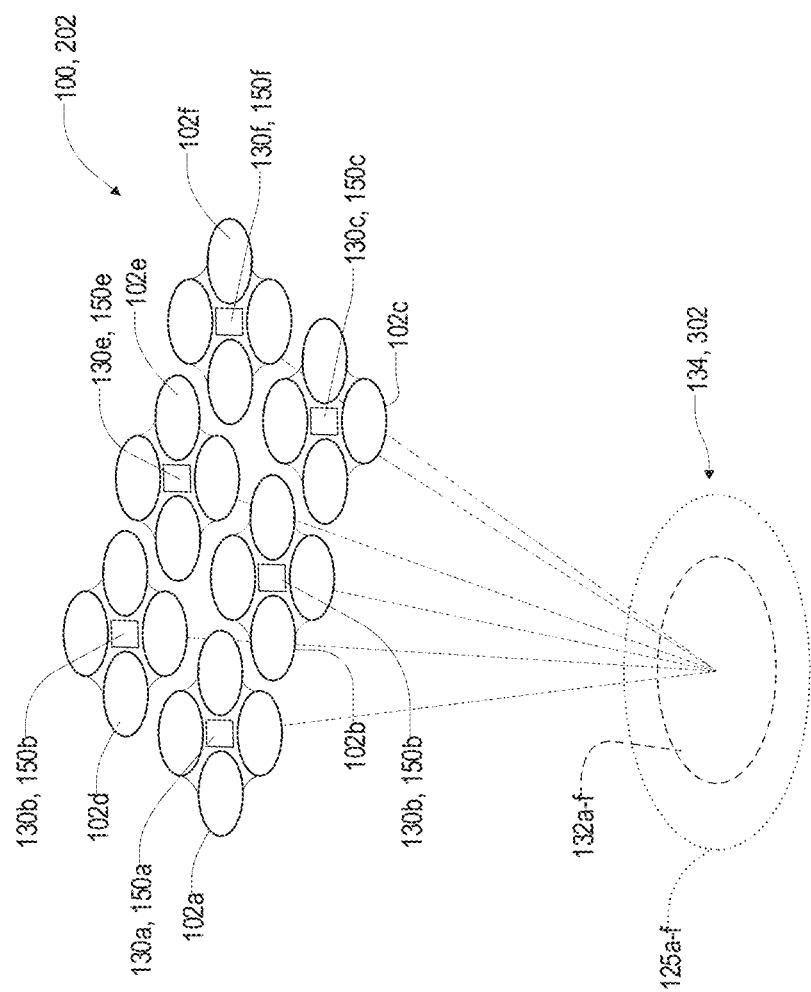
FIG. 3 is a projected view of a grouping of drones comprising a lighting system operating in a second configuration.

Referring to FIGS. 1-3, a coordinated lighting system 100 is shown in connection with a plurality of drones 102. As illustrated, each of the drones 102 includes a frame 104. The frame 104 or body of the drone 102 may be formed of various lightweight, rigid materials. Examples of such materials may include aluminum, aircraft steel, graphene, carbon fiber, etc. The frame 104 of the drone 102 may be configured to connect a propulsion system 106 of the drone 102 with a payload 108. Accordingly, the frame 104 may interconnect a body 110, support arms 112, and propulsion units 114 to form the drone 102. The propulsion units 114 may correspond to lifting propellers configured to generate lift sufficient to support and transport the payload 108. Accordingly, the drone 102 may be configured to position and transport the payload 108 suspended in the air. Further detailed discussion of the drone 102, a corresponding control system, and related aspects of the disclosure are further discussed in reference to FIG. 10.

The payload 108 of the drone 102 may include a lighting assembly 120, which may form a portion of the coordinated lighting system 100. In the example shown in FIG. 1, the lighting assembly 120 may include one or more imagers 124 configured to capture image data in a field of view 125. The imager 124 may be positioned within or coupled to the lighting assemblies 120 via a positioning assembly 126. The imager 124 may be a charge-coupled device (CCD) imager, a complementary metal-oxide-semiconductor (CMOS) imager, other types of imagers, and/or combinations thereof. According to various examples, the imager 124 may include one or more lenses to collimate and/or focus the light emitted from the lighting assembly 120.

The lighting assembly 120 may be implemented in a variety of configurations, which may include one or more light source(s) 130 configured to output one or more emissions 132 of light. In order to provide for flexibility in the payload 108, the lighting assembly 120 may be implemented as a modular device that may be selectively connected to the drone 102. Additionally, as later discussed in reference to FIGS. 4-7, the lighting assembly or a plurality of the lighting assemblies 120 may be supported by a collapsible supported linkage assembly. Accordingly, it shall be understood that variations in the lighting assemblies and corresponding articulating and positioning geometry are supported by the methods and systems discussed herein. An example of a lighting assembly with multiple positioning axes is further discussed in reference to FIG. 10.

As shown in FIG. 1, the lighting assembly 120 may be configured to illuminate an operating region 134 shown projected in the field of view 125 of the imager 124. The emission 132 may be emitted from one or more of the light source(s) 130 in various wavelengths of light, which may range from infrared to ultraviolet and include the visible spectrum of wavelengths. In some embodiments, the emission 132 may be emitted as infrared light (e.g., near-infrared, infrared, and/or far-infrared). In other embodiments, visible light may be emitted as the emission 132 to illuminate the operating region 134. Accordingly, the lighting assembly 120 may be flexibly applied to provide for various lighting operations including uniform illumination within the operating region 134. Additionally, the systems discussed herein may provide support for various applications of machine vision including object detection, recognition, tracking, inventory, and various other vision related applications. A detailed example of an illumination method and related systems that may be implemented by the lighting assemblies and systems discussed herein is provided in U.S. Pat. No. 10,240,751 B2, "SYSTEMS AND METHODS OF ILLUMINATION", the disclosure of which is incorporated herein by reference in its entirety.

In various examples, the lighting assembly 120 may be positioned or suspended from one or more positioning assemblies 126, which may adjust a projection direction of the light source(s) 130 by controlling one or more actuators 140. Accordingly, the positioning assemblies 126 may be configured to rotate and/or translate independently or in any combination. As shown, the system 122 may comprise a first positioning mechanism and a second positioning mechanism. In general, the positioning assembly 126 as discussed herein may be configured to control a direction of one or more light emissions 132 emitted from the light source(s) 130. As demonstrated and further discussed further herein, each of the light source(s) 130 as well as the positioning assemblies 126 may be in communication with a lighting controller 150, which may be configured to control a direction of the one or more lighting emissions 132 to illuminate the operating region 134.

In various embodiments, the one or more positioning assemblies 126 may comprise one or more gimbaled arms, which may be maneuvered or adjusted in response to a movement (e.g., rotational actuation) of one or more actuators 140a and 140b. In this configuration, the controller 150 may be configured to control each of the actuators 140a and 140b to manipulate the orientation of the lighting assembly 120 and a corresponding direction of the emission 132 from the light source 130. In this way, the positioning assembly 126 may control the rotation of the lighting assembly 120 about a first axis 154a and a second axis 154b. Such manipulation of the lighting assembly 120 may enable the controller 150 to direct the light source(s) 130 to selectively illuminate the operating region 134.

The positioning assemblies 126 and actuators 140a and 140b, as discussed herein, may correspond to one or more electrical motors (e.g., servo motors, stepper motors, etc.). Accordingly, each of the positioning assemblies 126 (e.g., the actuators 140) may be configured to rotate the lighting module 360 degrees or within the boundary constraints of lighting assembly 120 or other support structures that may support the lighting modules lighting assemblies 120. The controller 150 may control the motors or actuators 140 of the lighting assemblies 120 to direct the emission or a plurality of coordinated lighting emissions 132 to illuminate the operating region 134. In order to accurately direct the lighting assembly 120 to target a desired location, the controller 150 may be calibrated to control the position of the lighting assembly 120 to target locations in a shared grid or work envelope as further discussed herein.

FIGS. 2 and 3 demonstrate a plurality or swarm of the drones 102 hovering above the operating region 134 in an organized formation 202. Referring now to FIGS. 1, 2, and 3, each of the drones 102a, 102b, 102c, etc. may exchange position and flight information to control spacing and relative positioning to form the formation 202. Though additional drones or duplicate devices may be illustrated in the figures, some reference numerals may be omitted and like reference numerals are used for like elements for clarity. In some implementations, each of the drones 102 may comprise peripheral sensors 204, which may be configured to detect a proximity of one or more neighboring drones (e.g., 102a and 102b) of the formation 202. The peripheral sensors 204 may correspond to one or more proximity sensors including but not limited to ultrasonic, image sensors, radar sensors or other forms of proximity sensors. In this way, the controller of each of the drones 102 may monitor the relative location and spacing of the neighboring drones and adjust the position to maintain the formation 202.

The drones 102 may further comprise a communication interface, such that each of the drones 102 may communicate wirelessly to coordinate operations. The wireless communication among the drones 102 may provide for mutual control of spacing and orientation, such that the formation 202 may be accurately maintained. For example, in some examples, the controllers of the drones 102 may communicate directly among one another via a mesh network or communicate via a central controller or router. A drone control system 210 and corresponding controller and communication interface are discussed in detail in reference to FIG. 10.

As discussed in reference to FIG. 1, the drones 102 may be configured to couple with and interface with the payload 108 in the form of the lighting assembly 120. As shown, each of the drones in the formation 202 is in connection with one the lighting assemblies 120. In such implementations, the drone control system 210 may communicate with the lighting controller 150 to control the position of the light emissions 132 output from the light sources 130 to illuminate the operating region 134 in coordination. For example, based on a monitored and controlled spacing S between each of the drones 102 as provided by the formation 202, the lighting controller 150 of each of the lighting assemblies 120 in connection with a corresponding drone 102 may adjust the emission 132, such that combined emissions 220 may be controlled to provide coordinated lighting among each of the plurality of light sources 130a, 130b, 130c, 130d, 130e, 130f of each of the corresponding drones 102a, 102b, 102c, 102d, 102e, 102f.

In order to provide for the coordinated lighting emitted from each of the light sources 130a, 130b, 130c, 130d, 130e, 130f; the lighting controllers 150a, 150b, 150c, 150d, 150e, 150f may be configured to receive relative position and spacing information from of each of the corresponding drone control systems 210a, 210b, 210c, 210d, 210e, 210f. In this way, the lighting controllers 150 may determine the relative spacing and organization of the formation 202, such that the relative origins of the emissions 132 from the light sources 130 of the lighting assemblies 120 may be determined or known. Accordingly, the lighting controllers 150 may calculated a trajectory of each of the emissions 132 to illuminate the operating region 134 in a coordinated pattern or shape illuminating a desired region or area of the operating region 134.

For example, as shown in FIG. 2, a first portion 222 of the operating region is illuminated by the combined light emitted from the emissions 132a, 132b, 132c, etc. FIG. 3 demonstrates a second portion 302 of the operating region 134 illuminated by the combined light emitted from the emissions 132a, 132b, 132c, etc. The first portion 222 illuminates a larger surface area or region of the operating region 134 than the second portion 302 by spreading the emissions 132 from the light sources 130 over the operating region 134. In order to arrange the lighting assemblies 120 in this way, the lighting controllers 150 may coordinate the orientation of the light sources 130 via a central control system or a distributed control system incorporated in each of the controllers 150. In this configuration, each of the controllers 150 may be configured to identify an orientation of the actuators 140 and the corresponding positions of the lighting assemblies 120. Based on this information, the system 10 may be configured to map a combined illumination pattern or illumination coverage of each of the emissions 132. In this way, the lighting assemblies 120 may provide for a coordinated lighting system 100 to provide a scalable, dynamic-lighting system operable to emit the various emissions of light as discussed herein.

As previously discussed, each of the lighting assemblies 120 may comprise one or more imagers 124. In the exemplary embodiment, the lighting controllers 150 may process image data captured in each of the corresponding fields of view 125a, 125b, 125c, 125d, 125e, 125f may be configured to identify the extents of each of the corresponding light emissions 132 output from a connected drone (e.g. 132a from 102a) and each of the neighboring emissions 132b, 132d, and 132e. In this way, the lighting controllers 150 may adjust the focus or extent of the emissions 132 based on the illumination pattern of the combined emissions (e.g., 132a, 132b, 132d, and 132e) to ensure that the emissions 132 illuminate the targeted portion of the operating region 134 to provide for distributed, uniform illumination of the first portion 222; focused, consistent illumination of second portion 302; or coordinated illumination in various patterns or variations. Additionally, the number of lighting assemblies 120 and proportions or candle power of the emissions 132 may be scaled to illuminate the operating region 134 in various patterns or configurations.

In addition to the illumination of the portions 222, 302 of the operating region, the lighting controllers 150 may further process the image data to identify obstructions interfering with the illumination. In such embodiments, the controllers 150 of each of the lighting assemblies 120 may be configured to detect the obstructions and communicate among one another to identify the best response to adjust the lighting assemblies 120 to illuminate the operating region 134. The identification of obstructions may be based on a detection of an object in the image data. For example, if the first emission 132a from the first lighting assembly 120a is blocked or fails to reach a target region, the lighting controller 150a may identify that the obstruction based on inconsistencies or objects identified in the corresponding first field of view 125a. In response to the identification of the obstruction, additional lighting assemblies (e.g. 120b, 120d) may be controlled to illuminate a portion of the operating region 134 targeted for illumination by the first emission 132a. In this way, the coordinated lighting system 100 may provide for consistent illumination of the operating region 134.

In the examples discussed in reference to the detection of obstructions and verification of the illumination from the emissions 132, the lighting controllers 150 may be configured to adjust a focus or diameter of each of the emissions 132 as well as the orientation and trajectory of the emissions 132. For example, each of the lighting assemblies 120 may comprise a focal lens and adjustment feature configured to adjust the focus of the emissions 132, such that each may illuminate a desired portion of the operating region 134. Additionally, the lighting controllers 150 may detect variations in the position of each of the emissions 132 impinging on surfaces in the operating region 134. For example, if the first lighting controller 150a identifies that the second emission 132b is moving based on the image data captured in the first field of view 125a and/or based on an unexpected or unintended change in position identified via the drone control system 210, the lighting system 100 may control lighting assemblies 120a, 120b, 120c, 120d, 120e, 120f to illuminate the regions illuminated or intended for illumination by the second emission 132 of the second lighting assembly 120b. In this way, the controllers 150 of each of the lighting assemblies 120 may adjust the trajectory of the emissions 132 to correct for variations in one or more of the light sources 130.

FIGS. 4, 5, 6, and 7 demonstrate various examples of the coordinated lighting systems 100 implemented with collapsible armatures 400. For clarity, the collapsible armatures 400 demonstrated in the respective figures may be referred to as follows: a first support frame 400a shown in FIG. 4; a second support frame 400b shown in FIGS. 5A and 5B; a third support frame 400c shown in FIGS. 6A, 6B, and 6c; and a fourth support frame 400d shown in FIGS. 7A and 7B. In order to clearly describe the collapsible armatures 400, the similar aspects of each of the implementations will first be described. As shown in the figures, numerous duplicate reference numerals are omitted for clarity. That is, only a sample of like structures and elements are labeled in the figures to ensure that the reference numerals do not mask the associated structures. However, like structures in each of the figures are clearly labeled such that they may be easily identified.

In general, the collapsible armatures 400 may be considered to provide a similar operation as the positioning of the drones 102 as previously discussed. For example, each of the collapsible armatures 400 may comprise a plurality of linkages 402 interconnected to each other via a plurality of joints 404. The linkages 402 may be constructed of structurally rigid materials including, but not limited to, metals alloys, fiberglass, carbon fiber, and/or rigid polymeric materials. The joints 404 may be similarly constructed of rigid materials and may provide for rotation about at least one axis as demonstrated by the rotational arrows 502 demonstrated in FIG. 5A and referred to by reference numeral 406. In this configuration, each of the collapsible armatures 400 may be configured to extend to an extended arrangement 408 and a collapsed arrangement 410. Accordingly, each of the collapsible armatures 400 may be suspended from a support structure by supports 412 or hangers in the extended arrangement 408, such that the lighting system 100 may provide for convenient and effective illumination of the operating region 134.

As shown in FIGS. 4, 5A, 6A, and 7A, the collapsible armatures 400 are shown in the extended arrangement 408. In this arrangement, the lighting assemblies 120 are positioned in a grid or predetermined geometric arrangement, which is programmed into each of the corresponding lighting controllers 150. That is, based on the lengths of each of the linkages 402 and the spacing in the extended arrangement 408, the relationship and first spacing or spatial relationship of each of the lighting controllers 150 may be fixed, such that the dimensional relationship among the lighting assemblies 120 is predetermined based on the arrangement of the corresponding support frame 400a, 400b, 400c, 400d, 400e. Accordingly, the first spacing and dimensional relationship or relative position of each of the lighting assemblies 120 and the position of each of the associated imagers 124 may be predetermined and fixed based on the arrangement of the collapsible armatures 400 in the extended arrangement 408. Accordingly, in the extended arrangements 408, the spacing or spatial relationship and arrangement of the lighting assemblies may be programmed into the lighting controllers 150, such that calibration is unnecessary and setup of lighting systems 100 is expedited.

Based on the predetermined or fixed arrangement of the light assemblies 120 and the imagers 124, the controllers 150 may be configured to process the image data concurrently or in rapid sequence so that image data representative of the operating region 134 is consistently captured and monitored by the system 100. Accordingly, the system 100 may process the image data from the plurality of fields of view 125 to form a composite view of the operating region 134. The composite view or, more generally, the relationship of the combined image data captured in the fields of view 125 may be predetermined based on the spacing of the imagers 124 in connection with the armatures 400 in the extended arrangement 408. For example, the controllers 150 may be programmed such that the relationship of each of the positions of the fields of view 125 of the imagers 124 are programmed in the controllers 150. In this way, the controllers 150 may capture the image data in each of the fields of view 125 and identify the relative position of various objects in a shared grid or work envelope, such that the position of an object in each of the fields of view 125 may be identified among the controllers 150 in any portion of the operating region 134.

Figure 4:
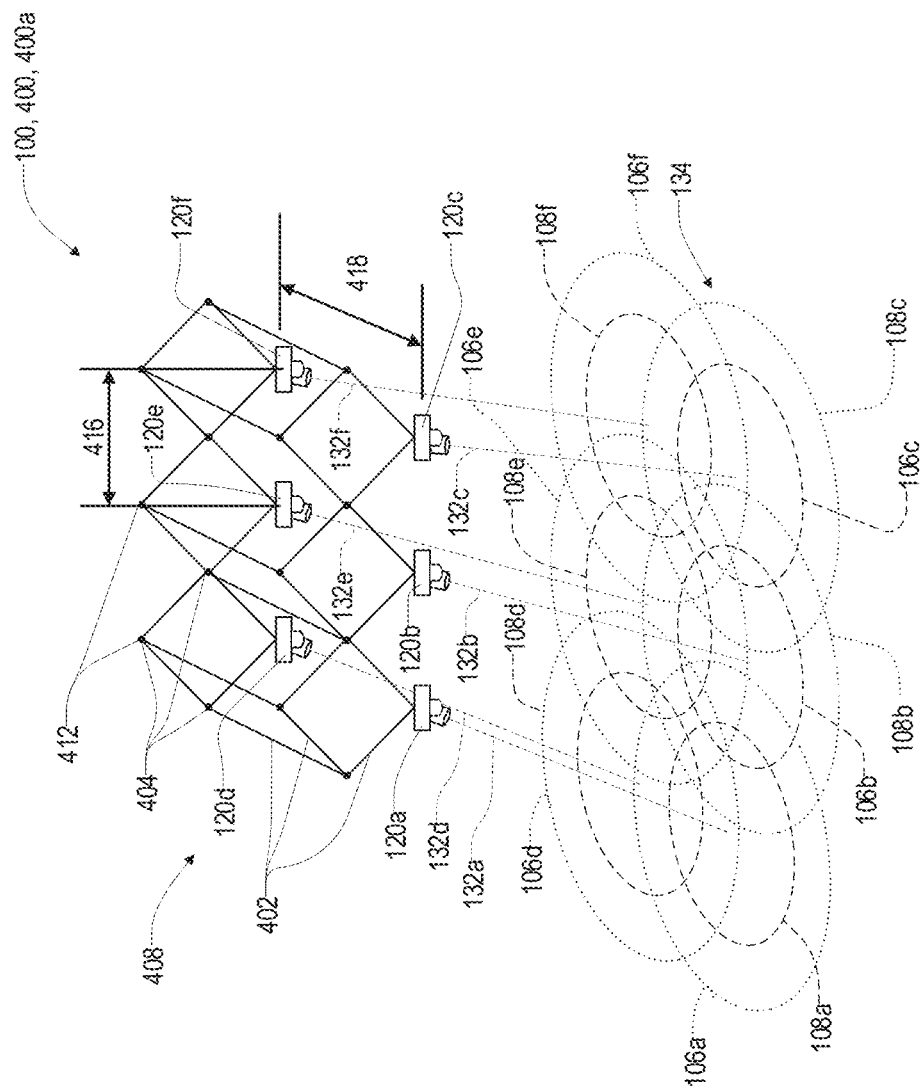
FIG. 4 is a projected view of a lighting system deployed, as one example, on a collapsible armature.

As shown in FIG. 4, the predetermined spacing associated with the first frame 400a in the extended arrangement 408 is denoted as a first axial spacing 416, and a second axial spacing 418, where the first axis aligned with the first axial spacing 416 is arranged perpendicular to the second axis aligned the second axial spacing 418. Additionally, each of the collapsible armatures 400 may be configured to arrange the lighting assemblies 120 along a plane extending along a third axis, which may be perpendicular to the first axis and the second axis. For example, the first axis, the second axis, and the third axis may correspond to the x-axis, y-axis, and z-axis, respectively.

In some embodiments, the spacing and alignment of the lighting assemblies 120 may not be aligned and evenly distributed as shown. For example, the geometry of the linkages 402 may vary such that the arrangement of the lighting assemblies 120 is not evenly distributed over the operating region 134. However, the dimensional relationships among each of the lighting assemblies 120 may still be fixed or predetermined in the extended arrangement 408, such that the lighting controllers 150 may be preconfigured and calibrated to provide coordinated control of the lighting assemblies 120 to provide for systematic and collaborative illumination of the operating region 134 without requiring calibration upon installation. In this way, the collapsible armature 400 may provide for a mechanical reference structure configured to maintain or set the spacing and relative alignment of the lighting assemblies 120 including the imagers 124. In this way, the lighting systems 100 discussed herein may be particularly useful for portable lighting as a result of the ease and speed of installation in combination with the reduced proportions or a second spacing provided by the collapsed arrangement 410.

As discussed herein, the arrangements of the collapsible armatures 400 and the predetermined spacing and relationships among the lighting assemblies 120 may further provide for coordinated operation of the imagers 124 to support object tracking, recognition, tracking, and various machine vision applications. Additionally, the image data captured by the imagers 124 may be adjusted or enhanced based on the light projected into the operating region 134 from the light sources 130. For example, the lighting controllers 150 may adjust the emissions 132 from one or more of the light source(s) 130 to include various wavelengths of light, which may range from the ultraviolet to infrared and include the visible spectrum of wavelengths. In some embodiments, the emission 132 may be emitted as infrared light (e.g., near-infrared, infrared, and/or far-infrared). In other embodiments, visible light may be emitted as the emission 132 to illuminate the operating region 134. Accordingly, the lighting assembly 120 may be flexibly applied to provide for various lighting operations including uniform illumination within the operating region 134.

Figure 5B:
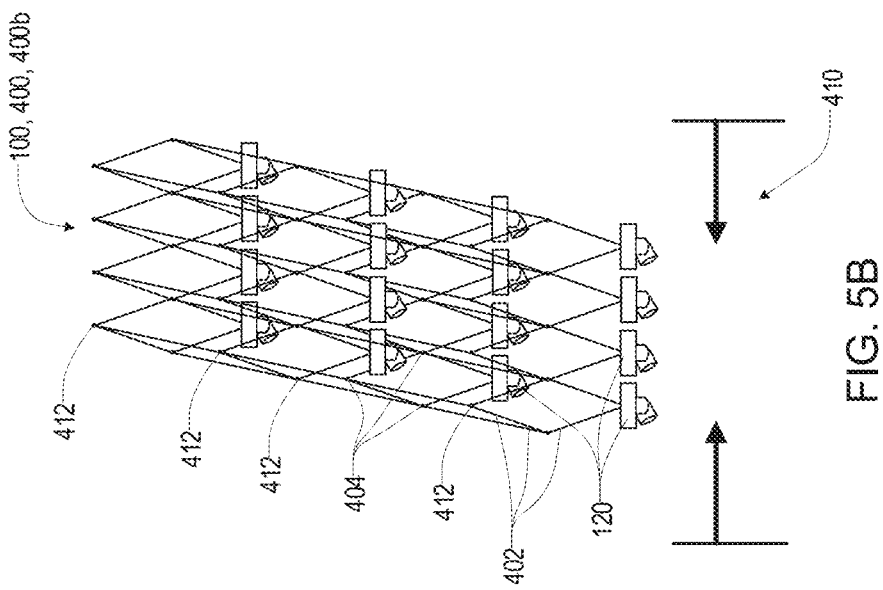
FIG. 5B is a projected view of a lighting system deployed on a collapsible armature in a collapsed transport arrangement.
Figure 5A:
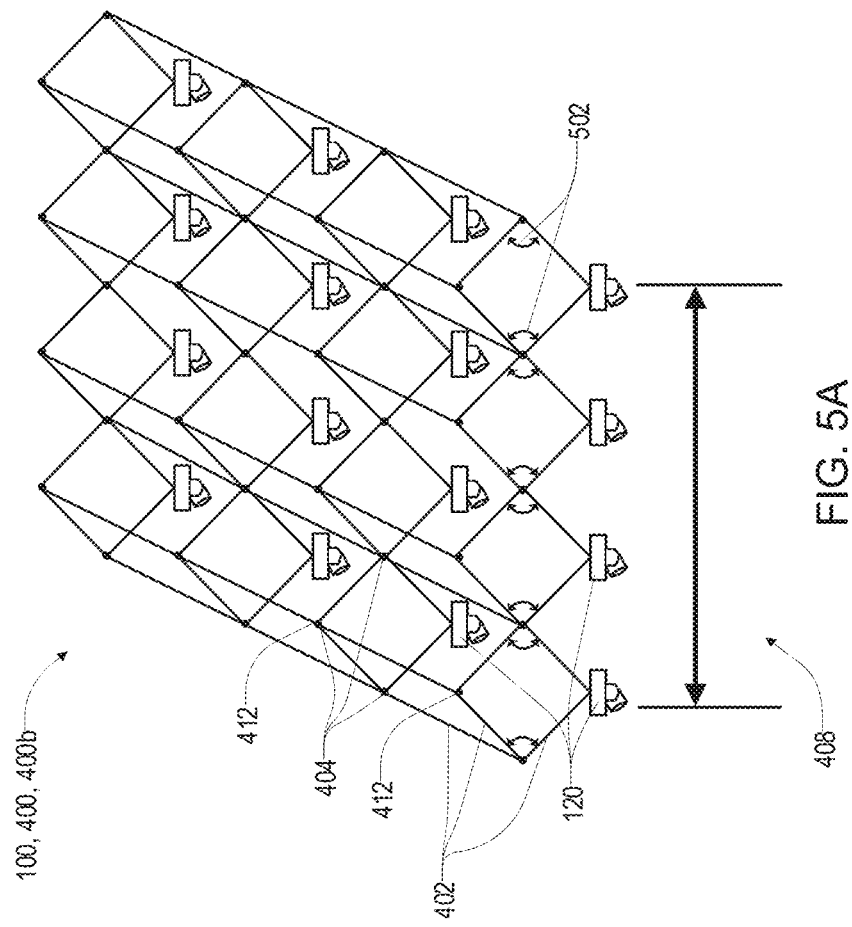
FIG. 5A is a projected view of a lighting system deployed on a collapsible armature in an extended or deployed arrangement.

Referring now to FIGS. 4, 5A, and 5B; the first frame 400a and the second frame 400b share the same configuration but include a different number of lighting assemblies 120 and corresponding frame proportions. As shown in FIGS. 4 and 5A, the extended arrangement 408 provides for even spacing among the lighting assemblies with the first axial spacing 416 and the second axial spacing 418. In the collapsed arrangement 410, the first axial spacing is diminished to a second axial spacing, such that the linkages 402 may overlap if the lighting assemblies 120 are removed from the collapsible armature 400. Alternatively, in the collapsed arrangement 410, the armatures 400 may be compressed such that the linkages 402 scissor together about the joints 404 to the extent that the lighting assemblies 120 are positioned side-by-side with the first axial spacing 416 minimized or eliminated. For example, the lighting assemblies 120 may touch or only be separated by padding or insulation to prevent damage in transport.

Referring now to FIGS. 6A, 6B, and 6C, the third frame 400c is shown in the extended arrangement 408 and the collapsed arrangement 410. In the example of the third frame 400c, the linkages 402 collapse along a first axis 602 in a scissoring motion about the joints 404. Additionally, the third frame 400c may be configured to fold about a central support truss 604. That is a first portion 606 of the linkages 402 and a second portion 608 of the linkages 402 may be configured to rotate inward as depicted by the arrows 610 in FIG. 6C about opposing joints 612 of the central support truss 604. In this way, the third frame 400c may collapse about the central truss 604, such that the linkages of the first portion 606 and the second portion 608 are rotated to align with a second axis 614 parallel to each other. Accordingly, the third frame 400c may provide for further compact arrangement of the lighting system 100.

Referring now to FIGS. 7A, 7B, and 7C, the fourth frame 400d is shown in the extended arrangement 408 and the collapsed arrangement 410. In FIG. 7A, a top-down view is shown and side views are shown in each of FIGS. 7b and 7C. In the example of the fourth frame 400d, the linkages 402 first disconnect at a connection joint 702. Once disconnected, the linkages 402 may be radially adjusted as shown by arrows 704 to align along a first axis 706. Once aligned, the linkages 402 may collapse along the first axis 706 in a scissoring motion about the joints 404. Additionally, the fourth frame 400d may comprise a plurality of radial spacing linkages 708, which may be configured to connect to a plurality of radial linkages 710 to form a radial configuration 712 about the radial linkages 710. Once the radial linkages 710 are aligned along the first axis 706 and collapsed about the joints 404, the radial spacing linkages 708 may also collapse and rotate inward as depicted by the arrows 714 in FIG. 7C. In this way, the fourth frame 400d may collapse to a linear configuration 716 from the radial configuration 712 to provide a compact arrangement of the lighting system 100 for transport. Though specific examples are discussed in FIGS. 4-7, it shall be understood that the arrangements of the armatures 400 may be combined and scaled in various ways to suit a desired lighting and computer vision application.

Figure 8:
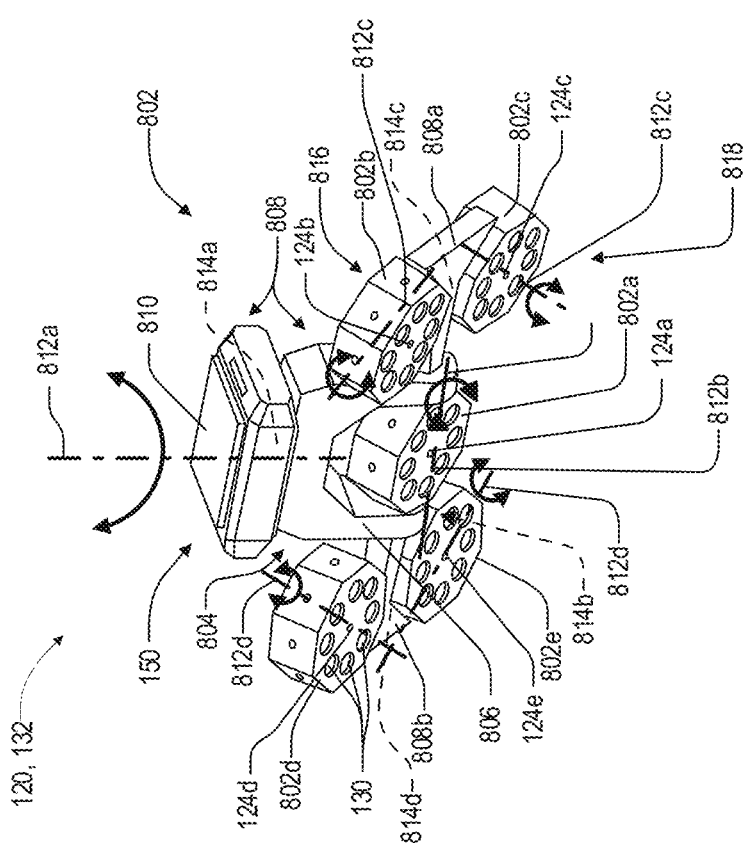
FIG. 8 is a schematic view of the lighting system comprising an articulating head assembly.

Referring now to FIG. 8, a schematic view of the lighting system 100 is shown comprising an exemplary implementation of the positioning assembly 126 referred to as an articulating head assembly 802. Each of the articulating head assemblies 802 may be implemented as lighting module arrays comprising a plurality of articulating lighting modules 802a, 802b, etc. Each of the articulating head assemblies 802 may serve as an exemplary embodiment of the one or more positioning assemblies 126 in accordance with the disclosure. In the exemplary embodiment shown, the articulating head assembly 802 comprises five of the lighting modules 802a, 802b, 802c, 802d, 802e. The lighting modules 802a, 802b, etc. may be suspended from a central control arm 804 comprising a plurality of support arms 806. Extending from each of the support arms 806, a lateral support beam 808 or wing may extend laterally outward from each of the arms 806 in opposing directions. In this configuration, the lighting modules 802a, 802b, etc. are supported by the central control arm 804 in a distributed arrangement.

The central control arm 804 may be suspended from a support housing 810 along a first axis 812a (e.g., Y-axis). The support housing 810 may comprise the controller 150 and a first actuator 814a configured to rotate the central control arm 804 about the first axis 812a. A first lighting module 802a may be suspended along a second axis 812b (e.g., X-axis) extending between the support arms 806. A second actuator 814b may be in connection with the support arms 806 and one of the lighting modules, for example the first lighting module 802a. The second actuator 814b may be configured to rotate the first lighting module 802a about the second axis 812b. In this configuration, the controller 150 may control the emission direction of the each of the lighting module 802*a*, 802*b*, etc. to rotate approximately 360 degrees about the first axis 812*a* and the second axis 812*b*.

Each of the lateral support beams 808 may support a pair of the lighting modules (e.g. 802*b* and 802*c*). That is, a first support beam 808*a* may support a second lighting module 802*b* on a first side 816 and a third lighting module 802*c* on a second side 818. The first side 816 and the second side 818 of the first support beam 808*a* may extend in opposing directions from the first support beam 808*a* along a third axis 812*c*. A second support beam 808*b* may support a fourth lighting module 802*d* on the first side 816 and a fifth lighting module 802*e* on the second side 818. The first side 816 and the second side 818 of the second support beam 808*b* may extend in opposing directions from the second support beam 808*b* along a fourth axis 812*d*. The third axis 812*c* and the fourth axis 812*d* may extend perpendicular to the second axis 812*b*.

Each of the first support beam 808*a* and the second support beam 808*b* may connect to each of the support arms 806 and rotate about the second axis 812*b* with the first lighting module 802*a*. Additionally, each of the lateral support beams may comprise at least one actuator configured to rotate the lighting modules 802*b*, 802*c*, 802*d*, and 802*e* about the third axis 812*c* and the fourth axis 812*d*. For example, the first support beam 808*a* may comprise a third actuator 814*c* in connection with the second lighting module 802*b* and the third lighting module 802*c* along the third axis 812*c*. The second support beam 808*b* may comprise a fourth actuator 814*d* in connection with the fourth lighting module 802*d* and the fifth lighting module 802*e* along the fourth axis 812*d*. In this configuration, the controller 150 may control the second actuator 814*b* to rotate each of the lighting modules 802*b*, 802*c*, 802*d*, and 802*e* about the second axis 812*b*. Additionally, the controller 150 may control the third actuator 814*c* to rotate the second and third lighting modules 802*b* and 802*c* about the third axis 812*c*. Finally, the controller 150 may control the fourth actuator 814*d* to rotate the fourth and fifth lighting modules 802*d* and 802*e* about the fourth axis 812*d*.

As previously discussed, each of the light modules 802*a*, 802*b*, etc. may comprise an imager 124. In some embodiments, the articulating head assembly 802 may comprise a single imager 124 or an imager array. For example, the imager array may be formed as follows: the first lighting module 802*a* may comprise a first imager 124*a*, the second lighting module 802*b* may comprise a second imager 124*b*, the third lighting module 802*c* may comprise a third imager 124*c*, the fourth lighting module 802*d* may comprise a fourth imager 124*d*, and/or the fifth lighting module 802*e* may comprise a fifth imager 124*e*. Each of the imagers 124 may be configured to capture the image data in corresponding fields of view 24*a*, 24*b*, 24*c*, 24*d*, and 24*e* (not shown for clarity). The controller 150 may process the image data from each of the imagers 124 to identify a region of interest. Accordingly, the controller 150 may scan the image data from each of the imagers 124 and adjust the orientation of each of the lighting modules 802*a*, 802*b*, etc. to dynamically control the light in the surgical suite 14.

Though the imagers 124 are discussed as being incorporated on each of the lighting modules 802*a*, 802*b*, etc., the system 122 may be configured to capture image data from any location in the surgical suite 14. As further discussed in reference to FIG. 9, a plurality of the articulating assemblies 802 may be controlled by a central controller 820 in communication with each of the controllers 150. In such embodiments, the central controller 820 may be configured to process the image data from the one or more imagers 124 and communicate control signals for each of the plurality of lighting modules 802*a*, 802*b*, etc. and the actuators 814 of the articulating head assemblies 802. Accordingly, the system 122 may be implemented in a variety of beneficial embodiments without departing from the spirit of the disclosure.

Figure 9:
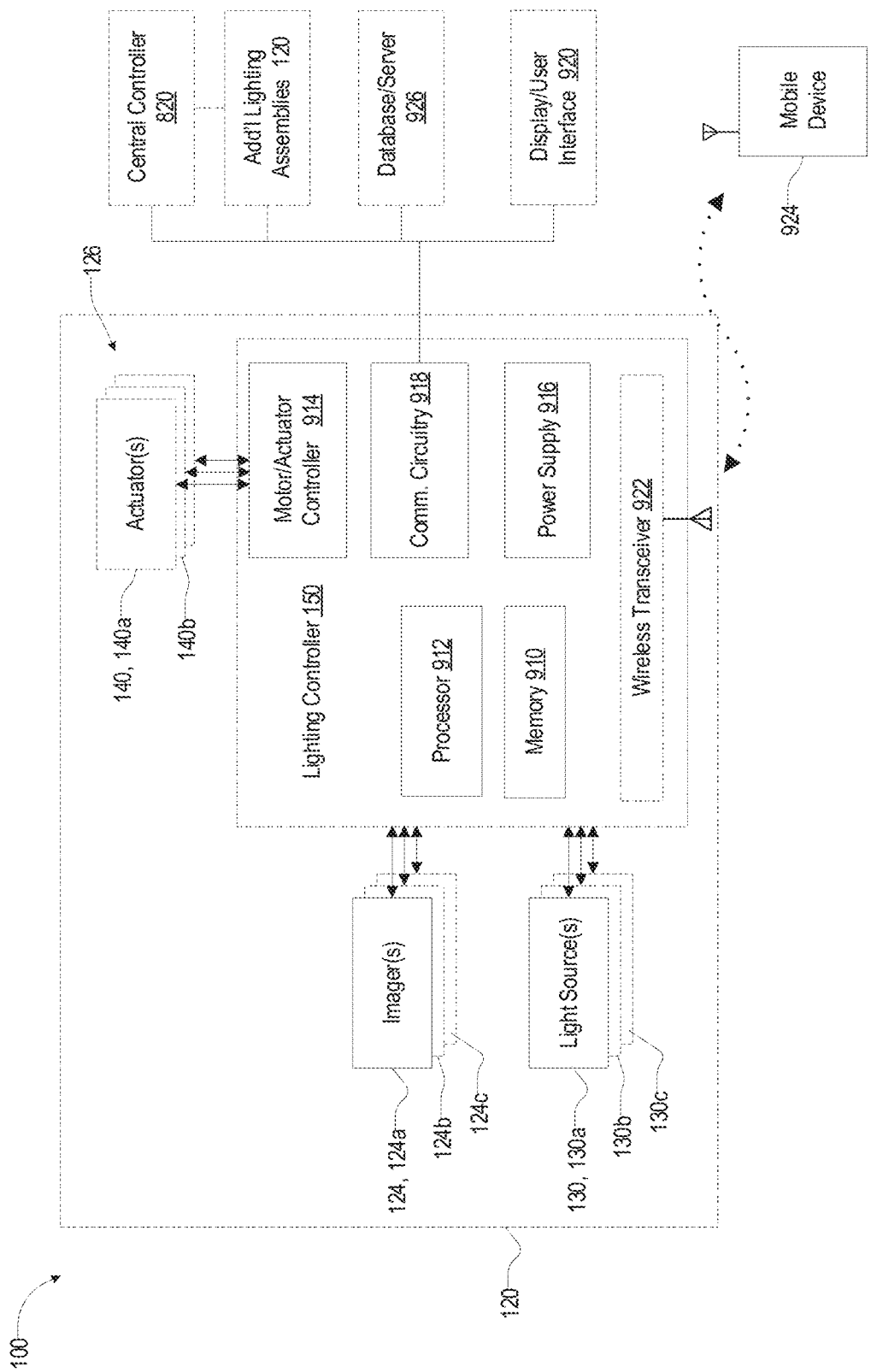
FIG. 9 is a block diagram of a coordinated lighting system.

Referring to FIG. 9, a block diagram of a coordinated lighting system 100 is shown. As discussed herein, the lighting system 100 may include one or more imagers 124 configured to capture image data from the working region 904 illuminated by the system 122. The imagers 124 may be configured to relay visual information to a controller 150 of the lighting system 100. The controller 150 may include a memory 910 and one or more processors 912. The memory 910 may store computer executable commands (e.g., routines) which are controlled by the processor 912. According to various examples, the memory 910 may include a light control routine and/or an image analyzing routine. In exemplary embodiments, the memory 910 may include control instructions configured to control one or more lighting control methods as discussed herein.

Once the image analyzing routine has processed the image data from the imager(s) 124, the controller 150 may communicate one or more control instructions to a motor or actuator controller 914. In response to the control signals, the motor controller 914 may control the actuators 140*a*, 140*b* or the positioning assemblies 126 to move, steer, or otherwise adjust an orientation of the lighting assemblies 120. In this way, the controller 150 may direct the lighting assemblies 120 to emit the lighting emission(s) 132 and/or direct the field of view 125 to a desired location. The system 122 may additionally comprise one or more power supplies 916. The power supplies 916 may provide for one or more power supplies or ballasts for various components of the lighting assemblies 120 as well as the actuators 140*a*, 140*b* or positioning assemblies 126.

As discussed herein the controller 150 and/or the central controller 820 may comprise one or more processors 912. The processor(s) 912 may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions such as one or more application, utilities, an operating system, and/or other instructions. The memory 910 may be a single memory device or a plurality of memory devices that are either on-chip or off-chip. Such a memory device may be a read-only memory, random access memory, volatile memory, non-volatile memory, static memory, dynamic memory, flash memory, and/or any device that stores digital information. Accordingly, each of the processing and control steps discussed herein may be completed by one or more of the processors or processing units as discussed herein based on one or more routines, algorithms, processes, etc. that may be accessed in the memory 910.

In some embodiments, the system 122 may further comprise one or more communication circuits 918, which may be in communication with the processor 912. The communication circuit 918 may be configured to communicate data and control information to a display or user interface 920 for operating the system 122. The interface 920 may comprise one or more input or operational elements configured to control the system 122 and communicate data. The communication circuit 918 may further be in communication with additional lighting assemblies 120, which may operate in combination as an array of lighting assemblies. The communication circuit 918 may be configured to communicate via various communication protocols. For example, communication protocols may correspond to process automation protocols, industrial system protocols, vehicle protocol buses, consumer communication protocols, etc. Additional protocols may include, MODBUS, PROFIBUS, CAN bus, DATA HIGHWAY, DeviceNet, Digital multiplexing (DM12612), or various forms of communication standards.

In various embodiments, the system 122 may comprise a variety of additional circuits, peripheral devices, and/or accessories, which may be incorporated into the system 122 to provide various functions. For example, in some embodiments, the system 122 may comprise a wireless transceiver 922 configured to communicate with a mobile device 924. In such embodiments, the wireless transceiver 922 may operate similar to the communication circuit 918 and communicate data and control information for operating the system 122 to a display or user interface of the mobile device 924. The wireless transceiver 922 may communicate with the mobile device 924 via one or more wireless protocols (e.g. Bluetooth®; Wi-Fi (802.11a, b, g, n, etc.); ZigBee®; and Z-Wave®; etc.). In such embodiments, the mobile device 924 may correspond to a smartphone, tablet, personal data assistant (PDA), laptop, etc.

As discussed herein, the system 122 may comprise or be in communication with one or more servers or remote databases 926. The remote database 926 may correspond to an information database, which may comprise identifying information configured to authenticate the identity of the staff or patients utilizing or illuminated by the system 122. The controller 150 of the system 122 may be in communication with the remote database 926 via the communication circuit 918 and/or the wireless transceiver 922. In this configuration, scanning data captured by the one or more imagers 124 may be processed by the controller 150 to authenticate an identity of the staff or patients locally and/or access information via the remote database 926.

In various embodiments, the light sources 130 may be configured to produce un-polarized and/or polarized light of one handedness including, but not limited to, certain liquid crystal displays (LCDs), laser diodes, light-emitting diodes (LEDs), incandescent light sources, gas discharge lamps (e.g., xenon, neon, mercury), halogen light sources, and/or organic light-emitting diodes (OLEDs). In polarized light examples of the light sources 130, the light sources 130 are configured to emit a first handedness polarization of light. According to various examples, the first handedness polarization of light may have a circular polarization and/or an elliptical polarization. In electrodynamics, circular polarization of light is a polarization state in which, at each point, the electric field of the light wave has a constant magnitude, but its direction rotates with time at a steady rate in a plane perpendicular to the direction of the wave.

As discussed, the lighting assemblies 120 may include one or more of the light sources 130. In examples including a plurality of light sources 130, the light sources 130 may be arranged in an array. For example, an array of the light sources 130 may include an array of from about 1×2 to about 100×100 and all variations therebetween. As such, the lighting assemblies 120 including an array of the light sources 130 may be known as pixelated lighting assemblies. The light sources 130 of any of the lighting assemblies 120 may be fixed or individually articulated. The light sources 130 may all be articulated, a portion may be articulated, or none may be articulated. The light sources 130 may be articulated electromechanically (e.g., a motor) and/or manually (e.g., by a user). In static, or fixed, examples of the light sources 130, the light sources 130 may be assigned to focus on various predefined points.

Figure 10:
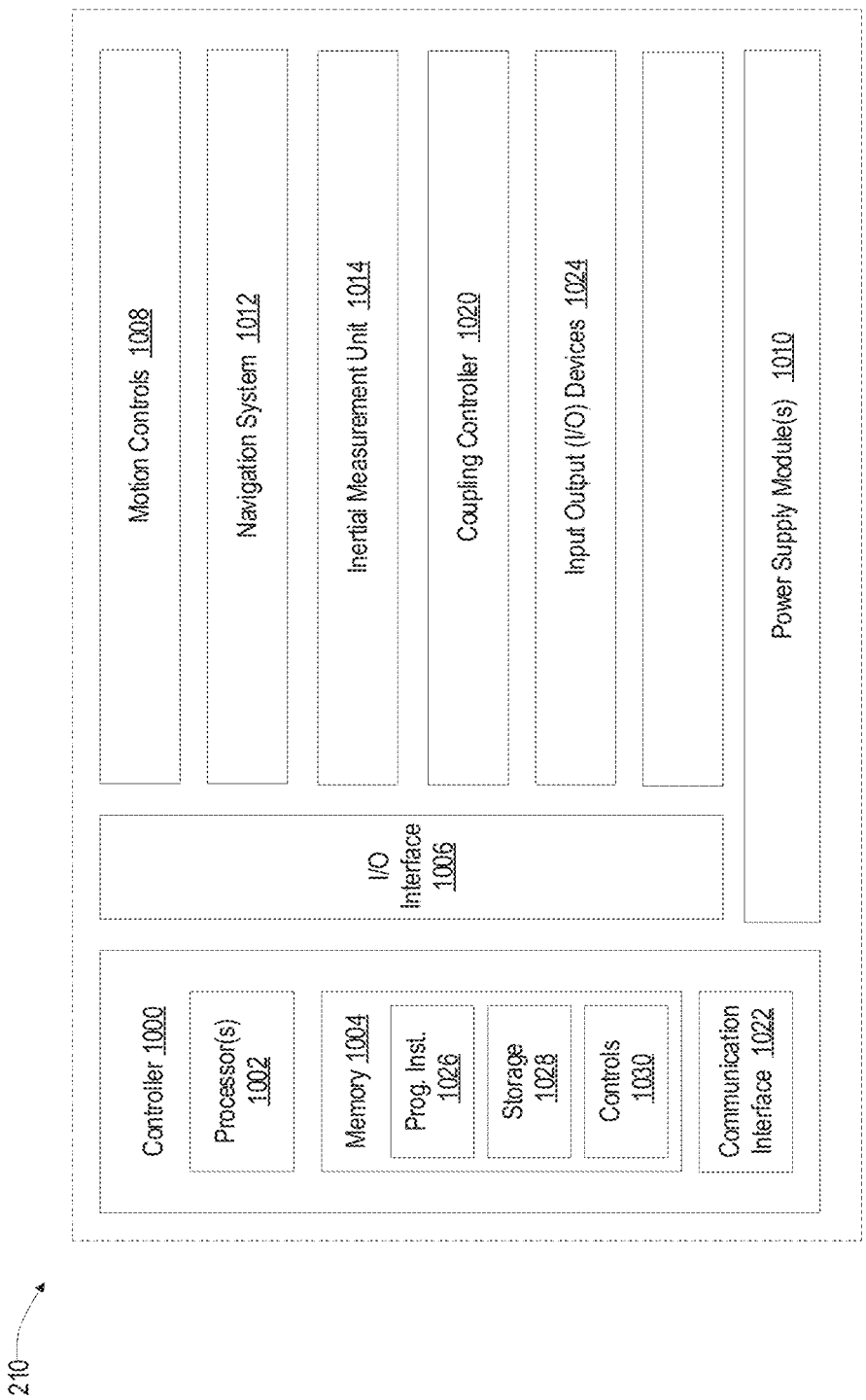
FIG. 10 is a block diagram of a drone control system in accordance with the disclosure.

Referring now to FIG. 10, a block diagram of a drone control system 210 is shown. As shown, the drone control system 210 may comprise a controller 1000 including one or more processors 1002, coupled to a memory 1004 (e.g., a non-transitory computer readable storage medium), via an input/output (I/O) interface 1006. The drone control system 210 may also include motion controls 1008, power supply modules 1010, a navigation system 1012, and inertial measurement unit (IMU) 1014. In some implementations, the IMU may be incorporated into the navigation system 1012. The drone control system 210 may also include a coupling controller 1020 configured to control the coupling component(s) used to couple/decouple the drone from other drones. The drone control system 210 may also include a payload engagement controller (not shown), a communication interface 1022, and one or more I/O devices 1024.

In various implementations, the drone control system 210 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The memory 1004 may be configured to store executable instructions, data, flight plans, flight control parameters, collective drone configuration information, drone configuration information, and/or data items accessible by the processor(s) 1002. In various implementations, the memory 1004 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the memory 1004 as program instructions 1026, data storage 1028 and flight controls 1030, respectively. In other implementations, program instructions, data, and/or flight controls may be received, sent, or stored upon different types of computer-accessible media, such as non-transitory media, or on similar media separate from the memory 1004 or the drone control system 210. Generally speaking, a non-transitory, computer readable storage medium may include storage media or memory media such as magnetic or optical media, e.g., disk or CD/DVD-ROM, coupled to the drone control system 210 via the I/O interface 1006. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the communication interface 1022.

The communication interface 1022 may correspond to a local mesh network topology of a centralized communication interface. For example, in the mesh network example, each of the controllers 1000 of the drones 102 may serve as a communication node in direct or indirect, non-hierarchical communication with each of the other drones 102. Mesh communication may be supported by various communication protocols, including but not limited to Bluetooth®, Bluetooth® low energy (BLE), Thread, Z-Wave, ZigBee, etc. In this configuration, the connected devices 100, 106, 108 may operate via a decentralized control structure. In some examples, the communication interface 1022 may correspond to a conventional centralized or hierarchical interface. In such examples, the drones 102 may communicate via a central controller of hub. The centralized communication may be implemented by a variety of communication protocols in various combinations, including but not limited to, global system for mobile communication (GSM), general packet radio services (GPRS), Code division multiple access (CDMA), enhanced data GSM environment (EDGE), fourth-generation (4G) wireless, fifth-generation (5G) wireless, Bluetooth®, Bluetooth® low energy (BLE), Wi-Fi, world interoperability for microwave access (WiMAX), local area network (LAN), Ethernet, etc.

In one implementation, the I/O interface 1006 may be configured to coordinate I/O traffic between the processor(s) 1002, the memory 1004, and any peripheral devices, the network interface and/or other peripheral interfaces, such as I/O devices 1024. In some implementations, the I/O interface 1006 may perform any necessary protocol, timing or other data transformations to convert data signals from one component (e.g., memory 1004) into a format suitable for use by another component (e.g., processor(s) 1002). In some implementations, the I/O interface 1006 may include support for devices attached through various types of peripheral buses, such as a variant of the Peripheral Component Interconnect (PCI) bus standard or the Universal Serial Bus (USB) standard, for example. In some implementations, the function of the I/O interface 1006 may be split into two or more separate components, such as a north bridge and a south bridge, for example. Also, in some implementations, some or all of the functionality of the I/O interface 1006, such as an interface to the memory 1004, may be incorporated directly into the processor(s) 1002.

The motion controls 1008 communicate with the navigation system 1012 and/or the IMU 1014 and adjust the rotational speed of each lifting motor to stabilize the drone and guide the drone along a determined flight plan. The navigation system 1012 may include a GPS, indoor positioning system (IPS), IMU or other similar system and/or sensors that can be used to navigate the drone 102 to and/or from a location. The payload engagement controller communicates with the actuator(s) or motor(s) (e.g., a servo motor) used to engage and/or disengage items.

The coupling controller 1020 communicates with the processor 1002 and/or other components and controls the coupling, data and/or resources sharing between the drone 102 and other drones in the formation 202. For example, if the coupling component is an electromagnet, the coupling controller 1020 may be utilized to activate the electromagnet to couple the drone 102 with another drone or deactivate the electromagnet to decouple the drone 102 from another drone.

The communication interface 1022 may be configured to allow data to be exchanged between the drone control system 210, other devices attached to a network, such as other computer systems (e.g., remote computing resources), and/or with drone control systems of other drones. For example, the communication interface 1022 may enable communication between the drone 102 that includes the control system 210 and a drone control system of another drone in the formation 202. In another example, the control system 210 may enable wireless communication between the drone 102 and one or more remote computing resources. For wireless communication, an antenna of a drone and/or other communication components may be utilized. As another example, the communication interface 1022 may enable wireless or wired communication between numerous drones. For example, when drones are coupled, they may utilize a wired communication via the coupling components to communicate.

When drones are not coupled, they may utilize wireless communication to communicate. In various implementations, the communication interface 1022 may support communication via wireless general data networks, such as a Wi-Fi, satellite, and/or cellular networks.

The I/O devices 1024 may, in some implementations, include one or more displays, imaging devices, thermal sensors, infrared sensors, time of flight sensors, accelerometers, pressure sensors, weather sensors, cameras, gimbals, landing gear, etc. Multiple I/O devices 1024 may be present and controlled by the drone control system 210. One or more of these sensors may be utilized to assist in landing as well as to avoid obstacles during flight.

As shown in FIG. 10, the memory 1004 may include program instructions 1026, which may be configured to implement the example processes and/or sub-processes described herein. The data storage 1028 may include various data stores for maintaining data items that may be provided for determining flight plans, landing, identifying locations for disengaging items, engaging/disengaging the pushing motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A system for controlling a plurality of lighting assemblies configured to selectively illuminate an operating region and a plurality of imagers configured to capture image data in a plurality of fields of view in the operating region, the system comprising:

a collapsible armature comprising a plurality of linkages configured to extend between an extended arrangement and a collapsed arrangement, wherein the extended arrangement positions the lighting assemblies in a first spacing and the collapsed arrangement positions the lighting assemblies in a second spacing; and a controller configured to:
receive the image data from a plurality of fields of view of the plurality of imagers in the operating region;
control an orientation of each of the lighting assemblies in the extended arrangement based on the predetermined first spacing;
control a direction of the lighting emissions from each lighting assembly based on the orientation; and
detect at least one object in the fields of view and control the lighting assemblies to illuminate the at least one object.

2. The lighting system according to claim 1, wherein the lighting assemblies are distributed in spatially separated positions in connection with the collapsible armature.

3. The lighting system according to claim 1, wherein the lighting assemblies comprise positioning assemblies configured to control the orientation of the light sources about at least one axis.

4. The lighting system according to claim 3, wherein the imagers are integrated into the lighting assemblies and configured to vary in orientation about the at least one axis.

5. The lighting system according to claim 3, wherein the positioning assemblies are configured to orient light sources of the lighting assemblies via a multi-axis positioning assembly.

6. The lighting system according to claim 3, wherein the controller is further configured to:
track the at least one object among the fields of view in a shared grid based on a predetermined spatial relationship in the extended arrangement.

7. The lighting system according to claim 1, wherein the extended arrangement positions the imagers in a predetermined spatial arrangement such that the fields of view of the imagers capture image data throughout the operating region.

8. The lighting system according to claim 7, wherein controller is further configured to identify a relative position of one or more objects in the image data from the fields of view based on the predetermined spatial arrangement of the imagers.

9. The lighting system according to claim 7, wherein the controller is further configured to:
identify the relative position of at least one detected object of the one or more objects with a first imager in connection with a first lighting assembly of the plurality of lighting assemblies; and
control a second lighting assembly of the plurality of lighting assemblies to illuminate the at least one detected object.

10. The lighting system according to claim 1, wherein the controller is further configured to:
identify the origin of emissions output from light sources of the lighting assemblies based on the first spacing.

11. The lighting system according to claim 1, wherein the first spacing is stored in the controller identifying the relative position of each light source of the lighting assemblies in the extended arrangement.

12. The lighting system according to claim 1, wherein the controller is further configured to:
detect a position of light emissions emitted from light sources of the lighting assemblies impinging on a surface based on the image data.

13. The lighting system according to claim 1, wherein the collapsible armature is configured to be suspended from at least one hanger bracket in connection with the plurality of linkages.

14. The lighting system according to claim 13, wherein the plurality of linkages are interconnected by a plurality of joints and the collapsed arrangement comprises the plurality of linkages and joints retracted such that the second spacing among the lighting assemblies is less than the first spacing.

15. A portable light system comprising:
a lighting array comprising a plurality of lighting modules configured to emit light emissions into an operating region, wherein the lighting array is configured to adjust a direction of the lighting emissions about a plurality of axes;
a collapsible armature in connection with each of the lighting modules, wherein the collapsible armature is configured to extend between an extended arrangement, wherein the lighting modules are arranged in a first spatial configuration, and a collapsed arrangement, wherein the lighting modules are arranged in a second spatial configuration;
at least one imager in connection with the collapsible armature configured to capture image data in a field of view directed into the operating region; and
a controller configured to:
process the image data and detect at least one object; and
control the lighting modules to illuminate the at least one object in a plurality of locations in the operating region, wherein the direction of the lighting emissions and a corresponding location in the operating region impinged upon by the lighting emissions is adjusted by the controller based on a predetermined relationship of the lighting assemblies set by the first spatial configuration.

16. The system according to claim 15, wherein a spacing of the lighting modules is greater in the first spatial configuration than in the second spatial configuration.

17. The system according to claim 15, wherein a plurality of linkages and joints of the collapsible armature adjust in orientation from the collapsed arrangement to the extended arrangement.

18. The system according to claim 17, wherein the collapsed arrangement corresponds to a transport configuration, wherein the linkages of the collapsible armature are collapsed and compressed relative to one another.

19. The system according to claim 15, wherein the at least one image comprises a plurality of imagers arranged in predetermined positions in connection with the collapsible armature in the extended arrangement, and wherein the controller is further configured to:
process the image data from the plurality of imagers and identify a location of the at least one object in the operating region based on the predetermined positions of the imagers and the corresponding locations of the fields of view of the imagers in the operating region.

20. A modular illumination apparatus comprising:
a lighting array comprising a plurality of lighting modules configured to emit light emissions into an operating region, wherein the lighting array is configured to adjust a direction of the lighting emissions about a plurality of axes;
a collapsible armature in connection with each of the lighting modules, wherein the collapsible armature is configured to extend between an extended arrangement, wherein the lighting modules are arranged in a first spatial arrangement, and a collapsed arrangement, wherein the lighting assemblies are arranged in a second spatial arrangement;
a plurality of imagers in connection with the lighting modules, wherein the imagers are configured to capture image data in a plurality of fields of view distributed through the operating region; and a controller configured to:
 process the image data from the plurality of imagers and identify a location of the at least one object in the operating region;
 detect a location of the at least one object in the operating region in the fields of view based on the first spatial arrangement of the lighting modules and the corresponding positions of the fields of view of the imagers in the operating region; and
 control the lighting modules to illuminate the at least one object in the location identified in the image data, wherein the direction of the lighting emissions and the location in the operating region impinged upon by the lighting emissions is adjusted by the controller based on a predetermined relationship of the lighting assemblies set by the first spatial arrangement.

* * * * *